Sept. 7, 1926.                L. BLACKMORE                1,598,955
                              VEHICLE BUMPER
                    Filed Dec. 10, 1923    2 Sheets-Sheet 1

Inventor
Lloyd Blackmore

Sept. 7, 1926.

L. BLACKMORE

VEHICLE BUMPER

Filed Dec. 10, 1923    2 Sheets-Sheet 2

1,598,955

Patented Sept. 7, 1926.

1,598,955

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

VEHICLE BUMPER.

Application filed December 10, 1923. Serial No. 679,677.

This invention relates to vehicles, and is illustrated as embodied in a motor vehicle having rear wing bumpers of novel form and arrangement.

An object of the invention is to give maximum protection to the vehicle, and the usual lights and other accessory devices carried by the vehicle, and to its fenders, by arranging wing bumpers to take the first shock from the front bumper of a following car in case of a rear end collision, the wing bumpers being yieldable into alinement with the usual spare tire before the fenders or accessory devices are reached. Thus the tire provides an unyielding resistance to the front bumper of the colliding car, after the maximum desirable yielding of the wing bumpers has taken place.

Another feature of the invention relates to a novel wing bumper which is well adapted for use as described above, and which is shown as comprising vertically-spaced impact bars pivotally connected to a resilient supporting bar secured to the chassis frame.

Other objects and features of the invention, including various novel combinations of parts and desirable particular constructions, will be apparent from the following description of the illustrative embodiments shown in the accompanying drawings, in which Fig. 1 is a top plan view of the rear end of an automobile equipped with the described bumpers;

Figure 1:
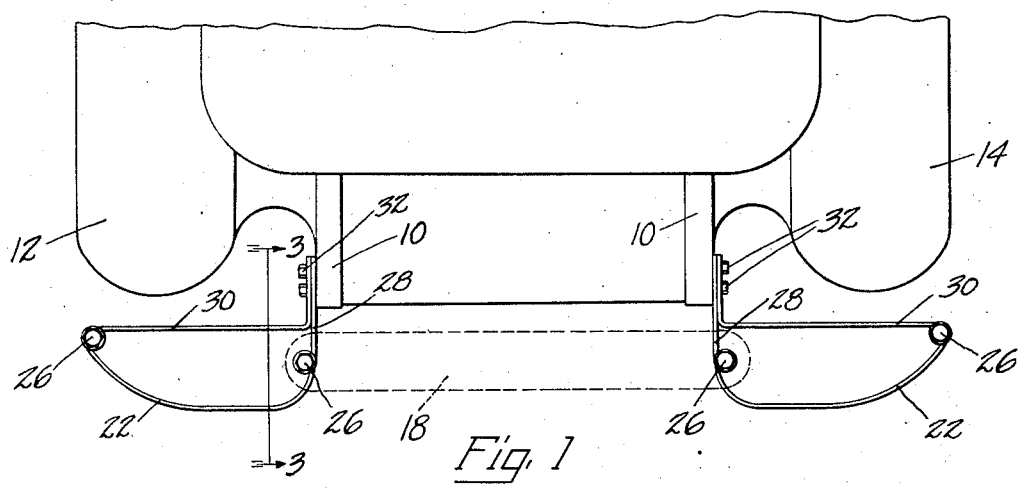
Figure 2:
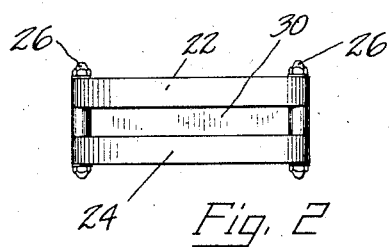
Fig. 2 is a rear elevation of one of the bumpers.
Figure 3:
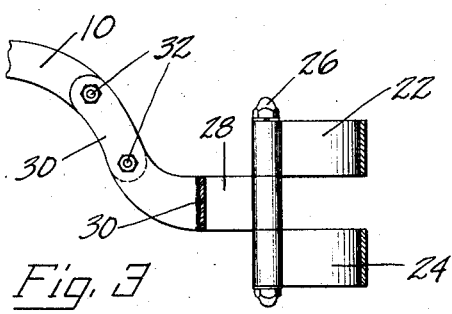
Fig. 3 is a section on the line 3—3 of Fig. 1, showing one of the bumpers in longitudinal vertical section.

In these drawings, the invention in several modified forms is shown embodied in an automobile having a chassis frame with side members 10, and side fenders 12 and 14. Preferably there is a support or carrier 16 for a spare tire 18, so arranged that the tire serves to protect accessory devices such as tail, "stop", and backing lights 20.

According to the present invention, a wing bumper is arranged on each side of the car, to protect the corresponding fender without obstructing the spare tire, the lights, the gasoline tank, or the trunk which is often arranged between the spare tire and the car body. In the form shown in Figs. 1, 2, 3, 6 and 7, each wing bumper comprises vertically-spaced impact bars 22 and 24, pivotally connected by shackle bolts 26 to the outer ends of supporting bars 28 and 30. The ends of the bars 22 and 24, and the outer ends of the bars 28 and 30, are formed as eyes embracing the connecting shackle bolts 26. The adjacent ends of the supporting bars 28 and 30 are superposed, and are secured by bolts 32 to the downwardly curved ends of the side frame members 10.

Figure 6:
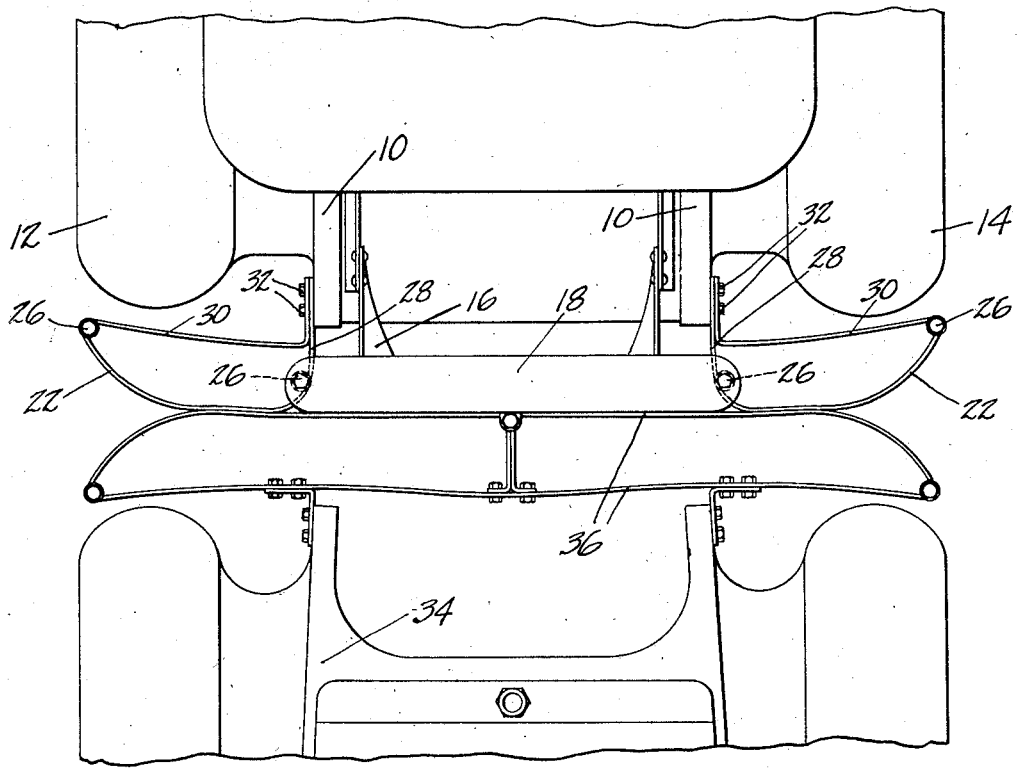
Fig. 6 is a top plan view showing a rear end collision of the automobile of Fig. 1 and a following car.
Figure 7:
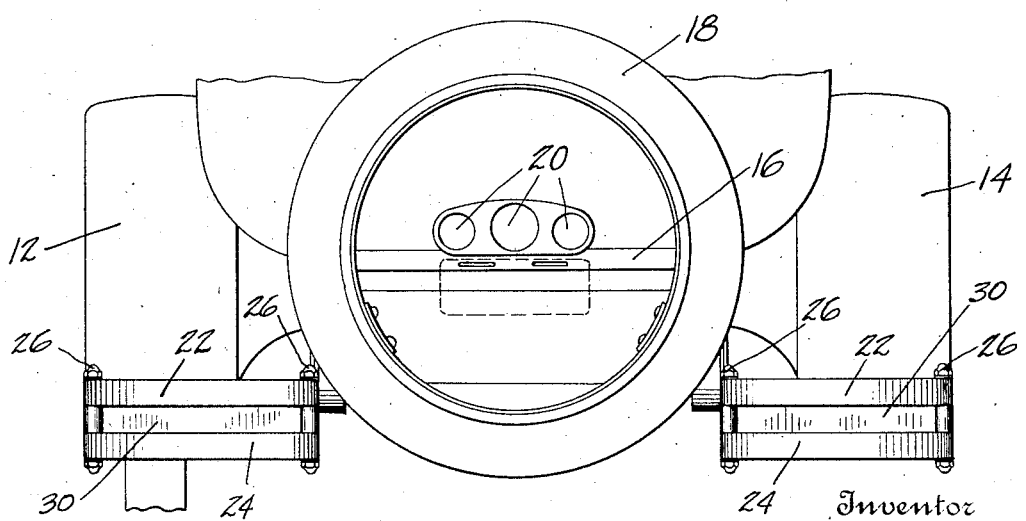
Fig. 7 is a rear elevation of the automobile of Fig. 1.

As best shown in Figs. 6 and 7, the bumpers are so arranged that in case of a rear end collision with a following car 34 having a front bumper 36, the wing bumpers will first yield to the maximum desirable extent, whereupon the front bumper 36 will engage the rigidly supported tire 18, which thus serves effectively to limit yielding of the bumpers before any damage is done to the fenders 12 and 14, and which also protects lights 20 against damage.

Figure 4:
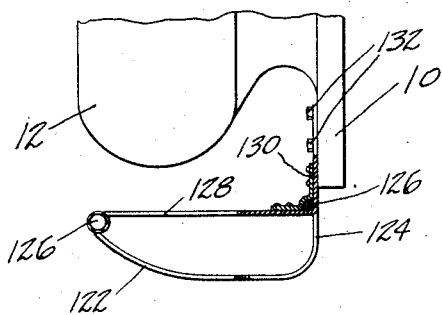
Fig. 4 is a top plan view corresponding to part of Fig. 1, but partly broken away, and showing a modified construction.

In the modification shown in Fig. 4, the impact bars 122 and 124 are connected at their outer ends by a shackle bolt 126 to a single supporting bar 128, and at their inner ends are connected thereto by a second shackle bolt 126 secured in an angle of bar 128 by an angle bracket 130 riveted to the bar. The supporting bar is held by bolts 132 passing through the side frame member 10.

Figure 5:
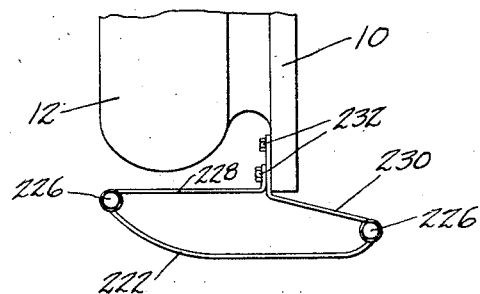
Fig. 5 is a top plan view corresponding to part of Fig. 1, but showing a third modification.

A different arrangement is shown in Fig. 5, in which the impact bars, one of which is shown at 222, are connected by a pair of shackle bolts 226 to supporting bars 228 and 230, the latter extending inwardly to serve as a resilient bracket. Bolts 232 secure the supporting bars to side frame member 10.

While several particular embodiments of my invention have been described in detail, it is not my intention to limit its scope to those embodiments, or otherwise than by the terms of the appended claim.

I claim:

A vehicle having, in combination, a chassis frame, a support for a spare tire carried by the frame, side fenders, and wing bumpers carried by the frame on opposite sides of the support in position to protect the fenders, the bumpers being pivotally supported from the frame at points in front of the vertical plane of the rear face of the tire, and extending rearwardly of the tire to take the first impact of the front bumper of a following car, said bumpers being yieldable into alinement with the rear face of the tire so that excessive force in case of a rear end collision is transmitted to the frame through the tire support before the bumpers are bent into engagement with the fenders.

In testimony whereof I affix my signature.

LLOYD BLACKMORE.